Patented Sept. 28, 1926.

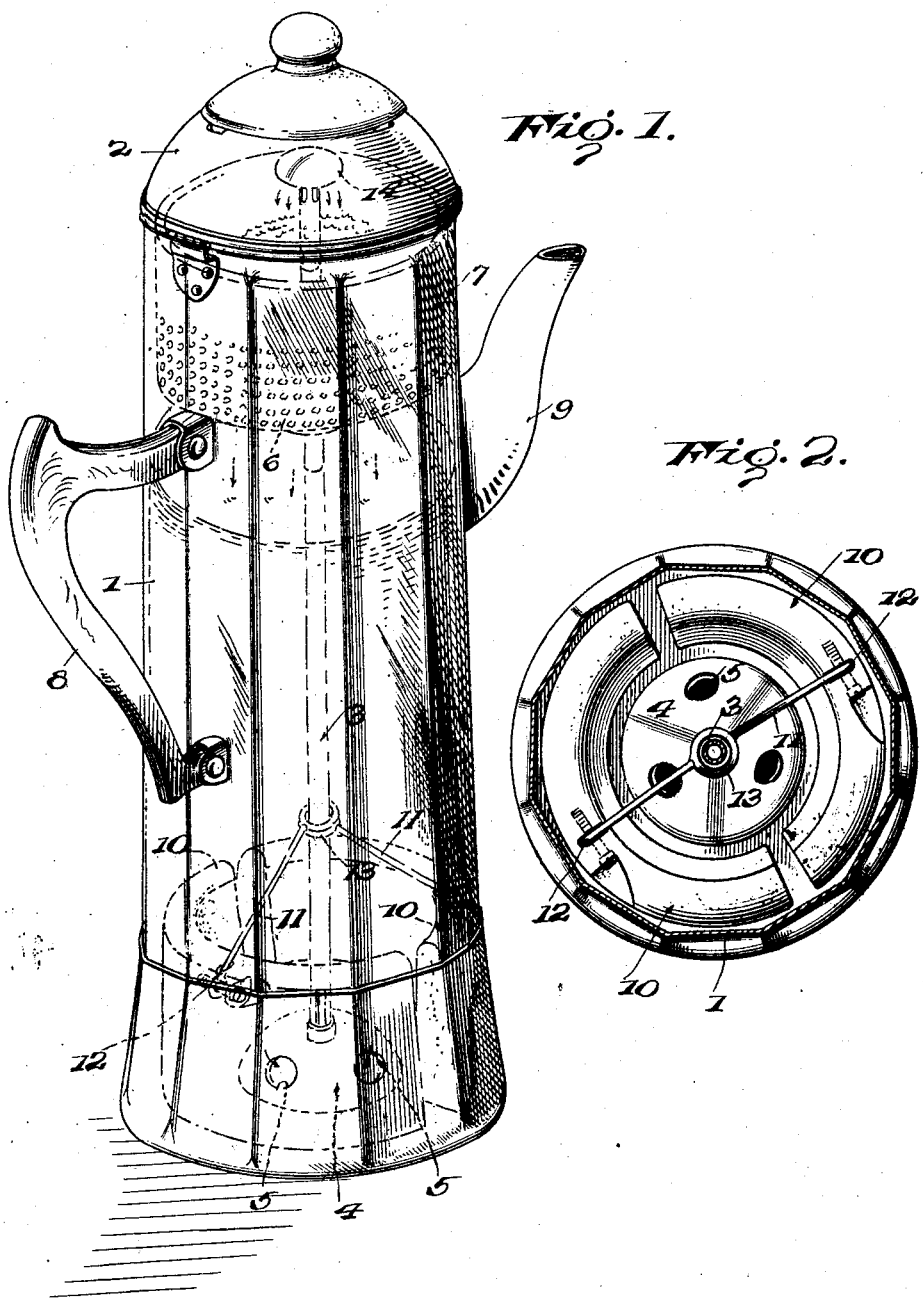

1,601,403

UNITED STATES PATENT OFFICE.

FRANK A. McGUIRE, OF CHERRYVALE, KANSAS.

COFFEE PERCOLATOR.

Application filed March 13, 1926. Serial No. 94,487.

My invention relates to improvements in coffee percolators, and it consists in the combinations, constructions and arrangements herein described and claimed.

It is well known that a coffee percolator which is adapted to hold a quantity of liquid sufficient for use in the preparation of a given quantity of beverage, say a quantity sufficient to fill six or eight ordinary cups, is not satisfactory for use when it is desired to prepare a less quantity of the beverage.

An object of the present invention is to adapt a coffee percolator of ordinary construction for use in an ordinary manner when it is desired to prepare a quantity of beverage less than that which is sufficient to fill the percolator substantially to its full capacity.

A further object of the invention is the provision of a pressure increasing means for a percolator which will afford facilities for varying the effective pressure within the associated percolator within limits as desired.

A further object of the invention is the provision of liquid displacing means for a percolator which can be quickly and easily placed within the percolator and as quickly and easily removed from the percolator for cleaning or any other desired purpose.

Other objects and advantages of the invention will be apparent from the following description, considered in conjunction with the accompanying drawing, in which—

Figure 1 is a perspective view of a coffee percolator equipped with a device embodying the invention, Figure 2 is a horizontal section through the percolator body.

In Figure 1, I show a percolator having a body 1 of conventional form. The body 1 is covered at its top by a hinged lid 2. A riser tube 3 is supported at its lower end on the bottom of the body 1 by a hollow convex-concave base member 4 having apertures formed therein, as at 5. The riser tube 3 is in open communication at its lower end with the space within the base 4 and extends vertically in the body 1 for substantially the full length of the latter. This riser tube extends through the foraminous bottom 6 of a substantially cup-shaped receptacle 7 which fits in the upper part of the body 1 and is adapted for the reception of ground coffee or other substance from which the flavor or soluble portions are to be extracted. The body 1 also is provided with a handle and with a spout 9 which communicates with the space within the body 1 below the level of the bottom of the receptacle 7.

The parts which have been described so far are ordinary in construction and form no part of the present invention except insofar as they cooperate with the parts which will now be described.

The space within the body 1 beneath the receptacle 7 is adapted to hold a quantity of liquid sufficient for the preparation of a given quantity of beverage, as for example a quantity of beverage sufficient to fill six or eight ordinary cups. It has been found in actual practice that when a less quantity of liquid is placed in the body 1, say a quantity sufficient for the preparation of beverage for filling only two cups, the prepared beverage will not have the desired flavor and the liquid in the lower part of the body 1 will not be forced when heated through the ground coffee receptacle 7 in a satisfactory manner. This objectionable result arises from the loss of water pressure at the base of the riser 3 since the ground coffee in the receptacle 7 at the top of the body 1 will act as a sponge and will hold the hot water which rises in the tube 3 so that in a short time so much of the water is held in the receptacle 7 that the water pressure in the bottom of the percolator is not sufficient to force hot water up through the riser pipe 3. The invention therefore contemplates the provision of an adapted or pressure increasing device which may be placed within the lower part of the body 1 when desired and which will function to displace liquid from the lower part of the body 1 so that the level of a quantity of liquid within the body 1 for the preparation of a quantity of beverage less than the capacity of the percolator will substantially coincide with the level of liquid in the percolator body 1 when the adapter or capacity reducing device has been removed and a quantity of liquid sufficient to fill the percolator body 1 to its full capacity is disposed within the body 1. The pressure increasing device shown in the drawings comprises a pair of displacer members 10, each of which is nearly but not quite a half of an annulus and is adapted to rest on the bottom of the percolator body 1 between the outer edge of the base 4 and the side wall of the percolator body. The members 10 may be porcelain, aluminum, or any other suitable substance which is completely insoluble at any temperature to which it will be heated in service and which will not affect or be affected by the liquid with which it will come in contact during the use of the percolator in an ordinary manner. Each member 10 may have a strap or rod 11 attached to its upper part, as at 12, the upper end portion of each strap or rod 11 having an eye 13 which encircles the tube 3. This eye 13 can be slipped over the upper end of the tube 3 when the receptacle 7 and the usual knob, indicated at 14, have been removed from the tube 3, and the associated member 10 then may be lowered or dropped into the receptacle body. Also, it is obvious that the members 10 will be moved from the receptacle body with the tube 3 when the latter is drawn upwardly from the receptacle body since the eyes 13 are of less inner diameter than the base member 4 at the lower end of the tube 3. When the members 10 are in place in the lower part of the body 1, a quantity of liquid sufficient for preparing a quantity of beverage less than the capacity of the percolator 1 will extend upwardly within the body 1 substantially to the level to which a quantity of liquid for the preparation of the full amount of beverage for which the percolator is adapted would extend. Therefore, the beverage which is prepared by means of the percolator when the members 10 are in place within the percolator body will have substantially the same flavor as the beverage which can be prepared in greater quantity when the members 10 are not used. The extent of increase of pressure within the percolator may be varied by using only one or both of the members 10 at a given time and it is obvious that the number of members which comprise the pressure increasing device may be increased within limits, thus making possible a greater variation of increase of pressure of the percolator.

In the event that the receptacle for ground coffee should be rigidly attached to the riser pipe, the attaching member 11—13 may be replaced by attaching split spring rings adapted to encircle the riser pipe, the ends of each attaching ring being adapted to be sprung apart to permit the ring to be placed on or removed from the riser pipe.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. The combination with a percolator having a receptacle for a flavoring substance in its upper part and having a chamber for liquid underneath said receptacle, of a liquid displacing member removably disposed within said chamber for liquid between the bottom of said chamber and the receptacle in the upper part of the percolator and means within said percolator whereby said liquid displacing member may be raised in the percolator when said removable receptacle is removed from the percolator.

2. The combination with a percolator having a receptacle for a flavoring substance in its upper part and having a chamber underneath said receptacle for the reception of liquid, of a liquid displacing device comprising a plurality of separate members, each and all of said members being adapted to be removably disposed within said chamber for liquid.

3. The combination with a percolator having a riser tube extending vertically therein, a hollow base supporting said riser tube on the bottom of the receptacle, and a receptacle for a flavoring substance disposed in the upper part of the percolator and into which said riser tube discharges, of a plurality of liquid displacing members disposed within the lower part of the receptacle between said base and the side wall of the percolator, each of said displacer members being connected with said riser tube.

4. The combination with a percolator having a body adapted for the reception of liquid, a removable riser tube having a hollow base portion at its lower end adapted to rest on the bottom of the percolator body, a receptacle for a flavoring substance carried by the upper portion of the riser tube within the upper portion of the percolator body, a plurality of liquid displacing members removably disposed within the lower part of the percolator body between said base and the side wall of the percolator body, each of said displacer members being substantially semi-annular, and means connecting said displacer members with said riser tube so that removal of said riser tube from the percolator body will cause the removal of said displacer members also.

5. The combination with a percolator having a body adapted for the reception of liquid, a removable riser tube having a hollow base portion at its lower end adapted to rest on the bottom of the percolator body, a receptacle for a flavoring substance carried by the upper portion of the riser tube within the upper portion of the percolator body, a plurality of liquid displacing members removably disposed within the lower part of the percolator body between said base and the side wall of the percolator body, each of said displacer members being substantially semi-annular, and connecting members having their lower ends attached to the upper portion of said displacer members and having eye portions at their upper ends through which said riser tube extends, the inner diameter of said eye portions being less than the diameter of said base portion of the riser tube.

FRANK A. McGUIRE.